P. M. SALMON.
MACHINE FOR SKINNING FAT.
APPLICATION FILED MAY 15, 1918.
1,291,173.
Patented Jan. 14, 1919.
2 SHEETS—SHEET 1.
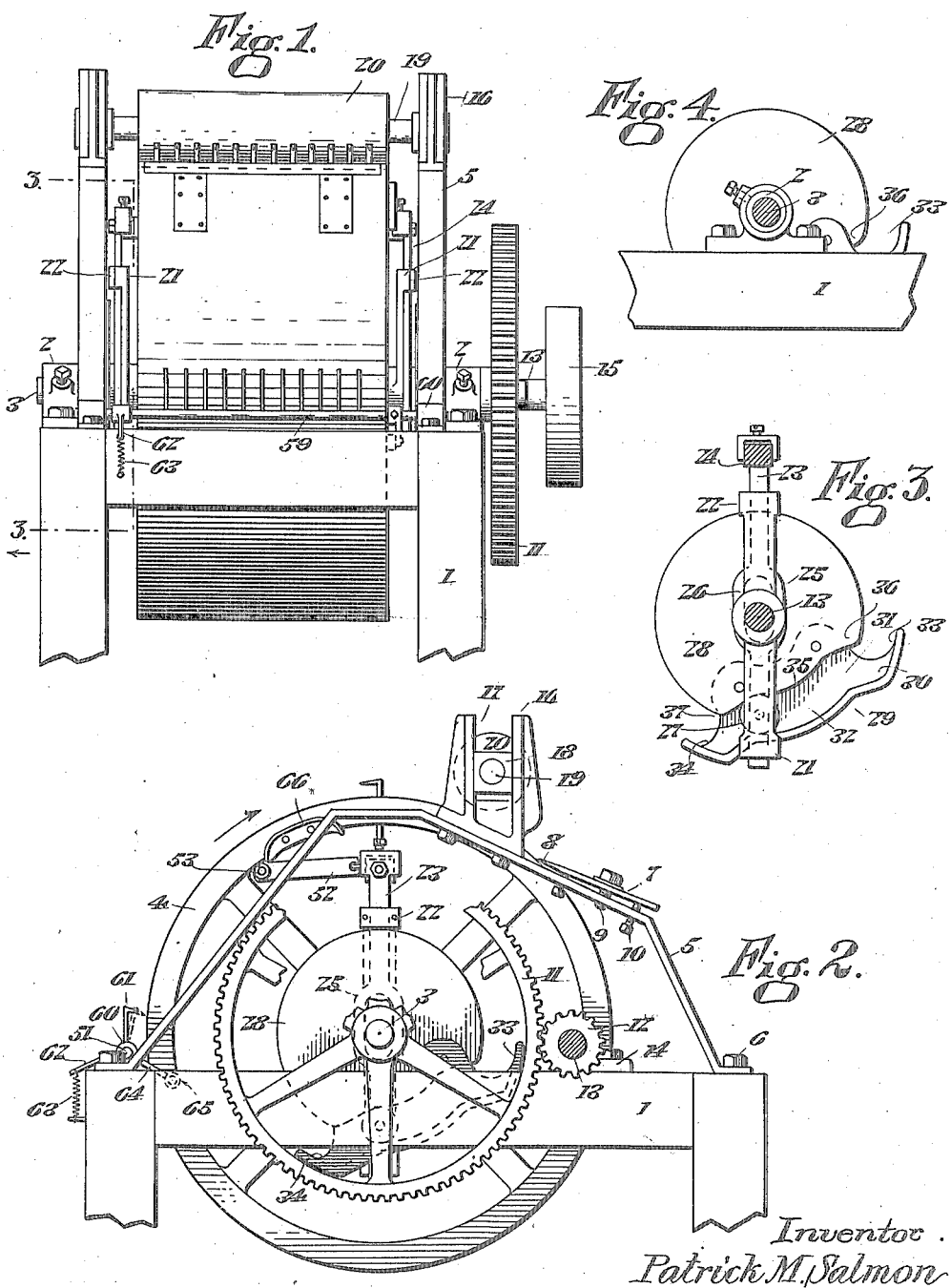
Inventor.
Patrick M. Salmon
Victor J. Evans
Atty.

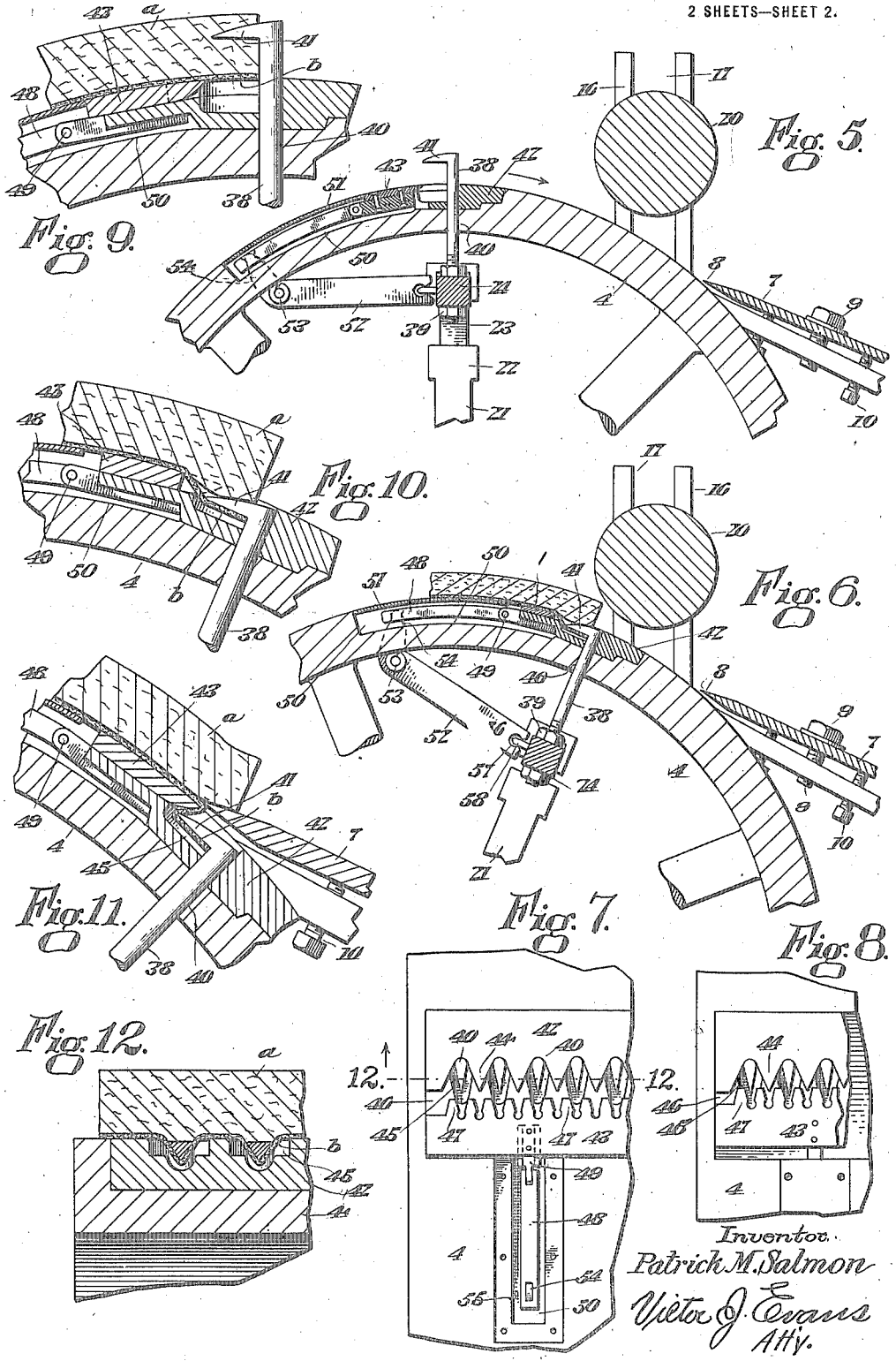

UNITED STATES PATENT OFFICE.

PATRICK M. SALMON, OF SOUTHBORO, MASSACHUSETTS.

MACHINE FOR SKINNING FAT.

1,291,173.   Specification of Letters Patent.   Patented Jan. 14, 1919.

Application filed May 15, 1918. Serial No. 234,733.

*To all whom it may concern:*

Be it known that I, PATRICK M. SALMON, a citizen of the United States, residing at Southboro, in the county of Worcester and State of Massachusetts, have invented new and useful Improvements in Machines for Skinning Fat, of which the following is a specification.

This invention is an improved machine for removing the skin from fat, especially pieces of pork fat, the object of the invention being to provide an improved machine of this character which is automatic in operation and which embodies a knife for separating the fat from the skin and also embodies a cylinder mounted for rotation and gripping means carried by the cylinder and which serve to grip the skin so as to hold the fat pieces on the cylinder and cause the cylinder by its rotation to feed the pieces to the knife so that the knife serves to separate the fat from the skin.

Another object of the invention is to effect improvements in the skin gripping means. Another object is to effect improvements in the means for operating the skin gripping means.

With the above and other objects in view, the invention consists in the construction, combination and arrangement of devices hereinafter described and claimed.

In the accompanying drawings:—

Figure 1 is a front elevation of the fat skinning machine constructed and arranged in accordance with my invention.

Fig. 2 is a side elevation of the same partly in section.

Fig. 3 is a detail elevation, partly in section, and showing one of the gripping hook operating cams and its connections.

Fig. 4 is a detail elevation of the same, showing the opposite side of the cam and showing the cylinder shaft in cross section.

Fig. 5 is a detail sectional view, on a larger scale, of the conveyer cylinder or roll and the skin gripping and fat cutting mechanism.

Fig. 6 is a similar view of the same and showing a piece of fat pork as being carried by the conveyer roll or cylinder and gripped by the gripping mechanism thereof.

Fig. 7 is a detail plan of the conveyer roll and the gripping mechanism and showing the gripping hooks and plate in initial position.

Fig. 8 is a similar view of the same and showing the gripping hooks and plate in gripping position.

Fig. 9 is a detail sectional view of the same.

Fig. 10 is a similar view of the same showing the gripping hooks and plate in gripping position.

Fig. 11 is a similar view of the same and showing the operation of the knife.

Fig. 12 is a sectional view on the plane indicated by the line 12—12 of Fig. 7 and on a larger scale.

The frame 1 may be of the construction here shown or of any suitable construction and is provided with bearings 2 in which the shaft 3 of the conveyer roll or cylinder 4 is mounted. At opposite sides of the frame 1 are arched supports 5 which are bolted thereon as at 6 and which are spaced from the ends of the conveyer roll. A knife 7 for cutting the skin from the fat is arranged with its cutting edge 8 near the periphery of the conveyer roll, the said knife extending longitudinally of the conveyer roll and being secured on the supports 5 by bolts 9, the said supports being also provided with adjusting screws 10 which bear against the under side of the knife and which coact with the bolts 9 to enable the knife to be adjusted to any desired angle with respect to the conveyer roll.

To one end of the roll shaft 3 is secured a spur gear 11, said spur gear being engaged by a pinion 12 of a driving shaft 13. Said driving shaft is mounted in a suitable bearing 14 and is provided with a belt pulley 15. On the supports 5 are guiding standards 16 each of which has a vertical guideway 17.

Blocks 18 are movable vertically in said guideways and are provided with bearing openings in which the ends of the shaft 19 of a presser roller 20 are mounted.

When the machine is in operation, the conveyer roll rotates in the direction indicated by an arrow in Figs. 2 and 5. Secured to the shaft 3 for rotation therewith are carrier bars 21 which are arranged near the ends of the conveyer roll and are provided on their outer sides with guides 22 in which the arms 23 of a gripper bar 24 are slidably mounted, the said arms having widened central portions 25 provided with slots 26 through which the shaft 3 extends. Said slots are shown in dotted lines in Figs. 2 and 3 and serve to enable the arms 23 to clear the conveyer roll shaft. The arms 23 of the gripper bar are provided with tappet rollers 27. Cams 28 are arranged concentrically of the shaft 3 and are fixedly secured. Each cam is segmental in form and is provided on one side with a member 29. Said member has a cam flange 30 which is spaced from one side of the cam and in coaction therewith forms a cam slot 31 which has a segmental central portion 32 and end portions 33, 34 which are offset from the central portion, the opposing side of the cam having a segmental face 35 which is concentric therewith and of less diameter than the cam and the cam also having offset shoulders 36, 37 which correspond with the offset faces 33, 34 of the member 29. The gripper bar is provided with a series of gripping hooks 38 which pass therethrough and are adjustable and secured by nuts 39, the said gripping hooks also passing through radial openings in the conveyer roll as indicated at 40, the heads of the points 41 of the gripping hooks extending toward the front end of the machine when they are on the upper side of the conveyer roll.

The cam ways 31 are on the under side of the conveyer roll and it will be understood that during a portion of each rotation of the conveyer roll said cam ways 31 cause the tappet rollers 27 which operate therein to move the arms 23 downwardly so that the gripper bar 24 moves the gripping hook downwardly to gripping position, and the concentric and small diameter portion 35 of the cams holds the gripping hooks in gripping position until the tappet rollers 27 reach the offsets 36, 37, said offsets of the cams then serving to move the gripping hooks outwardly to release position. Such movement of the gripping hooks occurs during the time while they move from a position immediately above the center of the conveyer roll to a point on the under side of the conveyer roll and near the front end of the machine.

A pair of gripping plates 42, 43 are also provided. The gripping plate 42 is fixed to the conveyer roll and is arranged in a recess therein and extends longitudinally thereof and has its outer face arranged flush with the periphery of the conveyer roll. Said plate is provided in its rear side with V-shaped points or teeth 44 between which the gripping hooks 41 operate. Said plate 42 is also provided with recesses 45 between the teeth 44, said recesses being of sufficient depth to receive the heads of the hooks when the latter are drawn inwardly and to also receive the skin engaged by the hooks. The plate 43 is arranged in a recessed guideway 46 with which the conveyer roll is provided and the said plate 43 is movable toward and from the plate 42 and is provided with blunt pointed teeth 47 which are directed toward the plate 42.

Links 48 are pivotally connected as at 49 to the movable gripping plate 43 and are arranged for movement in recesses 50 with which the conveyer roll is provided, said recesses being covered by plates 51. Bell crank levers 52 are pivotally mounted at the inner side of the conveyer roll as at 53 and have short arms 54 which are engaged in slots 55 with which the links are provided near their free ends. The long arms 56 of the bell cranks are provided at their outer ends with notches 57 and the gripper bar 24 is provided with tappets 58 which engage in the said notches so that the bell cranks are connected to the gripper bar for operation thereby.

The operation of the fat skinning machine is as follows: When the conveyer roll is in the position shown in Figs. 2 and 5 with the gripping hooks on the upper side of the roll and in raised position, a piece of fat pork is placed by the operator on the conveyer roll with the skin side next thereto and with the end under the gripping hooks. As the conveyer roll revolves in the direction indicated by the arrow in said figures the gripper hooks are pulled down through the fat indicated at $a$ and to the skin indicated at $b$ and as this occurs the bell crank levers are partly turned by the movement of the gripper bar 24 toward the center of the conveyer roll, so that the arms 54 of the bell crank levers coact with the links 48 to move the gripping plate 43 toward the relatively fixed plate 42 and hence the skin is not only gripped and held by the heads of the hooks and forced down into the recesses 45 but is also gripped between the teeth or points of the plates 42, 43 and so securely held. After the skin is thus gripped the pork passes under the presser roll 20 and engages the knife 8 the knife serving to separate the fat from the skin, the fat passing over the knife and the skin staying with the conveyer roll until the latter has nearly completed one revolution when the cams and coacting devices then serve to move the gripping hooks outwardly and to also move the movable gripping plate 43 from the relatively fixed gripping plate 42, thus releasing the skin and permitting the same to drop.

A rock shaft 59 is mounted in bearings 60 on the front portion of the frame 1 and is provided with hooks 61, the points of which extend toward the conveyer roll. Said rock shaft is also provided with an arm 62 to which a spring 63 is attached, said spring serving to turn the rock shaft in the required direction to move the hooks from the conveyer roll.

The rock shaft is also provided near one end with a rock arm 64, which rock arm has a tappet roller 65. A cam 66 is secured to the corresponding end of the conveyer roll, at a suitable point, and serves when it reaches the roller 65 to turn the rock shaft and move the points of the hook 61 toward the conveyer roll.

The said rock shaft 59 with its hooks 61 serves to pull the skin from the drum after the skin has been released by the gripping devices.

While I have herein shown and described a preferred embodiment of my invention, I would have it understood that changes may be made in the form, proportion and construction of the several parts, without departing from the spirit of my invention, and within the scope of the appended claims.

Having thus described my invention, I claim:—

1. In a machine of the class described, a conveyer roll, skin gripping hooks carried by the roll and arranged for radial movement with respect thereto, an element arranged within the roll for movement toward and from the periphery thereof and to which said hooks are secured, a relatively fixed element carried by the roll and having skin gripping teeth between which the hooks are arranged, an element carried by the roll and movable toward and from said relatively fixed skin gripping element, said movable element also having skin gripping teeth, means to actuate the first named element, bell crank levers operated by the first named element and links connecting said bell crank levers to said movable elements to cause the latter to be actuated simultaneously with the hooks.

2. In a machine of the class described, the combination of a conveyer roll, means to revolve the same, a knife held in fixed relation to the conveyer roll, a presser roller, skin gripping means carried by the conveyer roll, means to automatically operate the skin gripping means to cause the same to first grip and then release the skin, and means to pull the skin from the roll after the skin has been released.

3. In a machine of the class described, a conveyer roll, a knife, a presser roller, skin gripping hooks carried by the conveyer roll and movable radially with respect thereto, means to automatically actuate said hooks during each rotation of the conveyer roll, and means carried by the roll and coacting with the hooks to grip the skin before the fat is presented to the knife and to release the skin after the fat has been cut from the skin by the knife.

4. In a machine of the class described, a conveyer roll, skin gripping hooks carried by the roll and arranged for radial movement with respect thereto, a relatively fixed element carried by the roll and having skin gripping teeth between which said hooks are arranged, an element carried by the roll and movable toward and fom said relatively fixed skin gripping element, said movable element also having skin gripping teeth, and means to operate said hooks and said movable skin gripping element.

5. In a machine of the class described, a conveyer roll mounted for rotation, an element arranged within the roll and mounted for radial movement toward and from the periphery of the roll, said element being provided with skin gripping hooks and said hooks extending through the periphery of the roll and having pointed heads, tappets with which said element is provided, cams coacting with said tappets to automatically move said element in the required directions at each rotation of the roll, fixed skin gripping teeth carried by the roll and between which said hooks are arranged, a skin gripping plate carried by the roll, movable toward and from said teeth and also having teeth directed toward the first named teeth, links connected to said movable plate, and bell crank levers pivotally mounted in the roll and each having an arm connected to one of the links and also having an arm connected to said radially movable gripping element.

In testimony whereof I affix my signature.

PATRICK M. SALMON.